United States Patent [19]
Bisconti

[11] Patent Number: 4,794,675
[45] Date of Patent: Jan. 3, 1989

[54] ADJUSTABLE CLAMP WITH SLOT AND GUIDE

[76] Inventor: Edward M. Bisconti, 686 Bluff St., #202, Carol Stream, Ill. 60188

[21] Appl. No.: 176,471

[22] Filed: Apr. 1, 1988

[51] Int. Cl.$^4$ ............................................. A47F 7/00
[52] U.S. Cl. ..................................... 24/455; 24/456; 24/522; 211/17; 248/231.4
[58] Field of Search ................. 24/455, 456, 522, 514, 24/588, 265 C; 211/17; 248/231.4; 128/337

[56] References Cited

U.S. PATENT DOCUMENTS

| 189,442 | 4/1877 | Fales | 24/522 |
|---|---|---|---|
| 557,452 | 3/1896 | Thompson | 24/514 |
| 611,856 | 10/1898 | Brown et al. | 211/17 |
| 653,681 | 7/1900 | Lee | 211/17 |
| 1,760,346 | 5/1930 | Correa | 248/231.4 |
| 1,803,084 | 4/1931 | Wiziarde et al. | 24/522 |
| 3,544,049 | 12/1970 | Brown | 248/231.4 |
| 3,951,138 | 4/1976 | Akopov | 128/337 |
| 4,141,524 | 2/1979 | Corvese, Jr. | 248/231.4 |
| 4,201,215 | 5/1980 | Crossett et al. | 24/456 |

FOREIGN PATENT DOCUMENTS 0431131  9/1933  United Kingdom ................ 24/522

Primary Examiner—Victor N. Sakran
Attorney, Agent, or Firm—Henderson & Sturm

[57] ABSTRACT

A clamp for use especially in securing a bicycle front wheel to the bicycle frame in order to prevent swinging of the wheel about its steering pivot as when the bicycle is transported at the rear or on top of a vehicle, the purpose being to eliminate the problem of the wheel striking the transporting vehicle. The clamp comprises a pair of J-shaped members arranged with their flat legs lengthwise and overlapping each other so that the hooks of the J face each other for engagement of one hook with the bicycle frame while the other engages a portion of the front wheel rim of the bicycle. Provision is made for lengthwise adjustment of the members to accommodate different structural relationships, and a guide is provided for keeping the members parallel to each other during adjustment.

1 Claim, 1 Drawing Sheet

U.S. Patent     Jan. 3, 1989     4,794,675
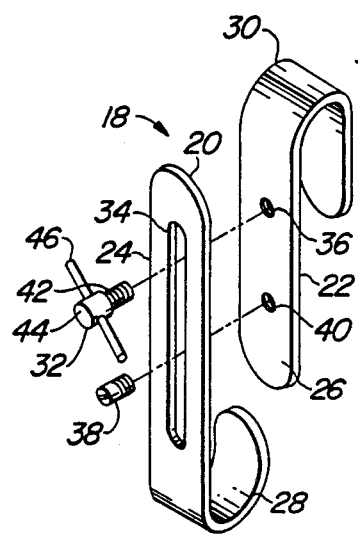
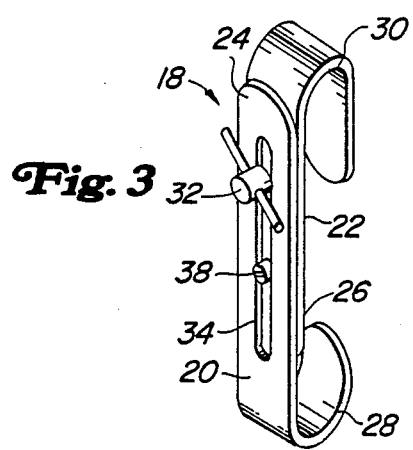
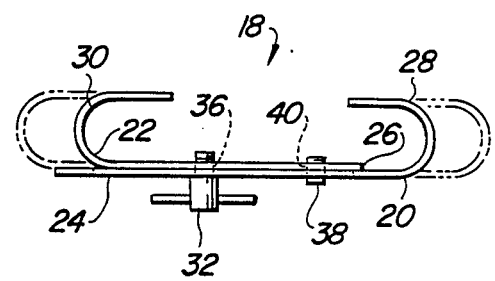
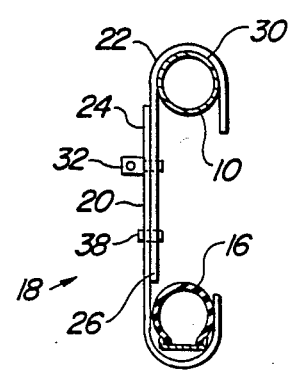

ADJUSTABLE CLAMP WITH SLOT AND GUIDE

BACKGROUND AND SUMMARY OF THE INVENTION

The transporting of bicycles on the rear ends or roofs of automotive vehicles has become a wide-spread practice and many forms of racks and brackets have been provided for that purpose. In many cases, the racks fail to provide for adequate support of control of the front wheel, which often results in swinging of the wheel back and forth about its steering pivot. sometimes causing damage to the transporting vehicle as well as annoying noise as the wheel bumps against the vehicle.

According to the present invention, a simple, adjustable clamp is provided as an easy, low-cost solution to the problem. It is a feature of the invention that the clamp may be simply constructed of flat stock, whether metal, plastic, etc., and comprises a pair of similar members, each of J shape arranged with the legs of the Js lying flatwise against each other and the hooks opening toward each other at the same side of the juxtaposed legs, one hook being adapted to hook over the bicycle frame and the other over the proximate portion of the front wheel rim. The two members are selectively longitudinal adjustable to accommodate varying structural relationship. It is a further feature of the invention that the members include cooperative guide means so that the members remain in parallel side-by-side relationship during adjustment.

Features and advantages other than those noted above will become apparent as a preferred embodiment of the invention is disclosed herein.

DESCRIPTION OF THE DRAWINGS

FIG. 1 is a reduced-scale view of the front portion of a typical bicycle illustrating the use of the invention.

FIG. 2 is an exploded perspective of the clamp, showing its parts.

FIG. 3 is a perspective of the assembled clamp.

FIG. 4 is a top elevation illustrating the assembled clamp and showing in broken lines the range of adjustability of the clamp members.

FIG. 5 is a section on the line 5—5 of FIG. 1.

DETAILED DESCRIPTION OF A PREFERRED EMBODIMENT OF THE INVENTION

Reference will be had first to FIG. 1 for an overview of the invention and its presently perceived use or environment. The numeral (10) denotes the front portion of a bicycle frame of typical configuration and having a fork (12) journaled in a generally upright sleeve (14) as part of the frame. A front wheel is shown at (16) as being carried by the fork. It is clear to those versed in the art that front wheel turns or steers in a rather wide range about the forked-sleeve pivot. When the bicycle is supported clear of the ground, the swinging of the front wheel is relatively free, as when the bicycle is carried by a vehicle in the usual carrying rack, which typically grasps the bicycle frame but does not ordinarily provide means for engaging the front wheel.

The clamp is designated as a whole by the numeral (18) and is made up of first and second members (20) and (22) which are J-shaped to provide elongated straight flat legs (24) and (26) respectively and hooks (28) and (30) respectively. The material used for making the members is preferably of flat, strap-like stock and may be of metal or plastic. If of metal, the members may be coated in any known manner to protect against marring the finish of the vehicle or bike carrier.

In use, the members are assembled in side-by-side relationship, with the legs overlapping each other and with the hooks opposed to and facing each other. In that mode, the members are adjustably secured together in the use position of FIGS. 1 and 5, one hook engaging over the bike frame (10) and the other engaging below and partly around the rim of the wheel (16). In this way, the clamp connects the wheels and frame so as to prevent swinging of the wheel about its fork pivot (14). The means securing the members together comprises a T-screw or thumb screw with shoulder and other similar fastening devices (32) which passes through an elongated slot (34) in the member (20) and threads into a tapped bore (36) in the member (22). In order to keep the members in parallelism during longitudinal adjustment, guide means is provided in the form of a stud or lug (38) fixed to the member (22) and projecting outwardly to slide in the slot (34). The stud is a short threaded member that threads into a tapped bore (40) in the member (22) that is spaced longitudinally from the tapped bore (36). Thus the stud and screw engable straight-line sliding in the members during adjustment, the range of which is indicated in broken lines in FIG. 4.

The screw has a threaded portion (42), an enlarged head (44) and a handle (46). The head engaged the member (20) to effect the clamping action when the screw is tightened. As noted, a wide range of adjustability is provided.

Features and advantages of the invention other than those noted above will occur to those versed in the art, as will many modifications in the preferred embodiment disclosed, all without departing from the spirit and scope of the invention.

I claim:

1. A clamp of the class described, comprising first and second members, each of rigid flat, strap-like material and of J shape, each having an elongated straight leg including a free terminal end and having its opposite end portion bent back upon itself to provide a hook, said members being juxtaposed to each other with the legs in flat-wise and lengthwise engagement with each other and with the hooks opening toward and facing each other at the same side of the juxtaposed legs, the first member leg having an elongated slot therein lengthwise thereof and the second member leg having first and second tapped bores normal to said second member leg and spaced apart lengthwise of said second member leg by a distance less than the length of the slot, said bores being in register with the slot, a guide stud carried by the second member leg and having a threaded portion threaded into the first bore and a coaxial head portion slidably received in the slot, and screw means having a threaded part threaded into the second bore and passing through the slot and having a coaxial shoulder outwardly of and larger than the slot for clamping the legs together.

* * * * *